UNITED STATES PATENT OFFICE.

JOSEPH THOMPSON, OF WILLESDEN, AND JOHN HENRY BRYANT, OF WESTMINSTER, COUNTY OF MIDDLESEX, ENGLAND.

ARTIFICIAL STONE.

SPECIFICATION forming part of Letters Patent No. 359,908, dated March 22, 1887.

Application filed January 25, 1887. Serial No. 225,475. (No specimens.) Patented in England November 14, 1884, No. 15,014; in France January 22, 1885, No. 166,585, and in Belgium October 13, 1885, No. 70,490.

*To all whom it may concern:*

Be it known that we, JOSEPH THOMPSON, of 2 Vallier Road, College Park, Willesden, in the county of Middlesex, England, carpenter, and JOHN HENRY BRYANT, of 45 and 46 Palace Chambers, in the city of Westminster, in the county of Middlesex, England, gentleman, have invented a new and useful Improvement in Artificial Stone, of which the following is a specification.

The object of this invention is to produce an artificial stone which is more particularly suitable for paving and flooring purposes, but which when formed into blocks may be used for retaining and other walls, the stone being quite impervious to moisture, and fire-proof and of great durability.

The invention consists in the employment of Portland cement, granite chippings, iron-slag, and silicate of soda, which are mixed together in suitable proportions, with the requisite quantity of water, in the manner usual in making concrete.

The mass, when mixed, may be laid *in situ*, or made into blocks or slabs in molds, slight pressure, by means of a rammer or otherwise, being employed, in order to express the air and to give the mass homogeneity.

The proportions which we prefer to use are: Portland cement, fifteen parts, by measure; crushed granite, fifteen parts, by measure; crushed iron-slag, forty parts, by measure; silicate of soda, ten parts, by measure; water, twenty parts, by measure. Total, one hundred parts, to which may be added, as desired, any suitable pigment to give any desired color to the stone to be produced.

The granite should be crushed to a size capable of passing through a quarter-inch mesh, and the iron-slag through a half-inch mesh, and these two ingredients, with the Portland cement, are thoroughly mixed together in a dry state. The requisite quantity of the silicate of soda is dissolved in the water, and the water is then applied to the heap of dry material, by preference in fine streams—say from the rose of a watering-pot—and the whole mass is turned over two or three times, as in making concrete. The mass may be then laid *in situ*, or made into slabs or blocks in molds, as before mentioned, and should be allowed to set before use.

The Portland cement is used as a binding material, and the granite to give body. The iron-slag gives hardness and durability, as well as the fire-proof quality of the material, while the silicate of soda accelerates the drying and increases the hardness and durability of the stone.

We may here remark we do not intend to confine ourselves to the exact proportions above stated; but these proportions give what we believe to be the best result.

Having now particularly described and ascertained the nature of our said invention and in what manner the same is to be performed, we declare that what we claim is—

In the manufacture of artificial stone, the combination of Portland cement, granite chippings, crushed iron-slag, silicate of soda, and water, in the proportions or about the proportions herein set forth.

JOSEPH THOMPSON.
    JOHN HENRY BRYANT.

Witnesses:
 AUG. SPICAUD,
 ARTHUR F. FARROW.